(12) United States Patent
Huang et al.

(10) Patent No.: US 9,029,433 B2
(45) Date of Patent: May 12, 2015

(54) PHOTOCURABLE ADHESIVE COMPOSITION

(75) Inventors: Chi-Yu Huang, Kaohsiung (TW); Chi-Ching Lu, Kaohsiung (TW); Hsiun-Chia Shih, Kaohsiung (TW)

(73) Assignee: Eternal Materials Co., Ltd., Kaohsiung (TW)

( * ) Notice: Subject to any disclaimer, the term of this patent is extended or adjusted under 35 U.S.C. 154(b) by 184 days.

(21) Appl. No.: 13/341,218

(22) Filed: Dec. 30, 2011

(65) Prior Publication Data

US 2012/0172477 A1  Jul. 5, 2012

(30) Foreign Application Priority Data

Dec. 31, 2010 (TW) ................................ 99147355 A

(51) Int. Cl.
| | |
|---|---|
| C08K 5/52 | (2006.01) |
| C09J 4/06 | (2006.01) |
| C09J 133/14 | (2006.01) |
| C08F 290/02 | (2006.01) |
| C08K 5/12 | (2006.01) |
| C08K 5/132 | (2006.01) |
| C08K 5/523 | (2006.01) |

(52) U.S. Cl.
CPC ........ *C09J 4/06* (2013.01); *C09J 133/14* (2013.01); *C08F 290/02* (2013.01); *C08K 5/12* (2013.01); *C08K 5/132* (2013.01); *C08K 5/523* (2013.01)

(58) Field of Classification Search
USPC .............. 522/71, 75, 76, 79, 82, 83, 90, 100, 522/103, 104, 96, 113, 114, 120, 121, 150, 522/151, 152, 153, 154, 173, 174, 178, 182
See application file for complete search history.

(56) References Cited

U.S. PATENT DOCUMENTS

| | | | | |
|---|---|---|---|---|
| 4,174,307 A | * | 11/1979 | Rowe | ............................. 522/96 |
| 7,335,425 B2 | * | 2/2008 | Olson et al. | .................. 428/523 |
| 7,696,258 B2 | * | 4/2010 | Choi et al. | ...................... 522/95 |
| 8,309,650 B2 | | 11/2012 | Determan | |
| 2007/0052796 A1 | * | 3/2007 | Choi et al. | .................... 348/101 |
| 2008/0286485 A1 | | 11/2008 | Zollner | |
| 2009/0105437 A1 | | 4/2009 | Determan | |
| 2011/0201717 A1 | * | 8/2011 | Held et al. | ...................... 522/33 |

FOREIGN PATENT DOCUMENTS

| | | |
|---|---|---|
| CN | 101465408 B | 12/2010 |
| JP | 2010-209126 A | 9/2010 |
| KR | 2008-0067492 A | 7/2008 |
| TW | 200844199 A | 11/2008 |
| TW | 200914563 A | 4/2009 |

OTHER PUBLICATIONS

Technical Data Sheet from Ciba Specialty Chemicals. Ciba IRGACURE 184. (2001).*
Technical Data Sheet from Ciba Specialty Chemicals. Ciba IRGACURE 651. (2001).*
Search report from Taiwan Patent Office for TW Application 099147355, corresponding to the current U.S. Appl. No. 13/341,218.
Office Action from Korean Patent Office, dated May 16, 2013, corresponding to the current U.S. Appl. No, 13/341,218.

* cited by examiner

*Primary Examiner* — Sanza McClendon
(74) *Attorney, Agent, or Firm* — Shimokaji & Associates, P.C.

(57) ABSTRACT

A photocurable adhesive composition is provided, which comprises: a) a (meth)acrylate oligomer having one or more functional groups, b) a mono-functional monomer, a multi-functional monomer, or a mixture thereof, c) a photoinitiator, and d) a plasticizer having a refractive index of no less than 1.48. The photocurable adhesive composition of the present invention has good light transmittance, high refractive index and appropriate flowability and softness, and is easy to be coated and adhered. The photocurable adhesive composition of the present invention can be applied to optical products and simplify the manufacture processes, and provide adhesion property while retaining good reworkability and optical properties.

20 Claims, 1 Drawing Sheet

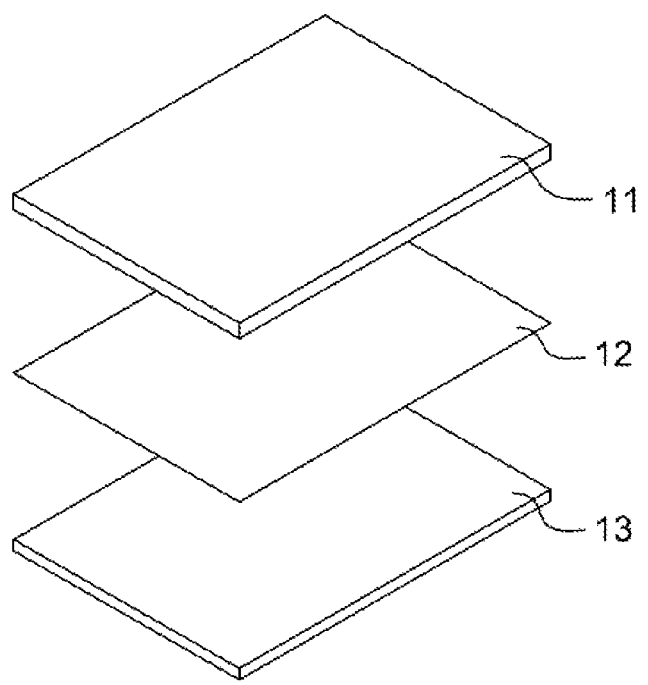

PHOTOCURABLE ADHESIVE COMPOSITION

BACKGROUND OF THE INVENTION

1. Field of the Invention

The present invention relates to a photocurable adhesive composition, and particularly to a photocurable adhesive composition for use in displays and touch panels.

2. Description of the Prior Art

With the fast growth of the information industry, electronic products such as mobile phones, personal digital assistants and notebooks have become daily necessities in the life of modern-day individuals. A display is an indispensable interface that allows the human-machine communication in these electronic products to take place. How to provide products that are lighter and thinner and have better visual effects has always been one of the main purposes behind the developments within the industry. Recently, touch panel has been integrated with display for use in various electronic products; users can touch the panel and conduct each of the operations such that a more convenient and humanized operation mode can be provided.

As shown in FIG. 1, the exterior portion of a normal touch panel includes cover lens 11 made of a polyester film or glass for strengthening and protecting the touch panel, and an adhesive layer 12 for adhering the cover lens 11 to an ITO film or ITO glass 13.

Adhesives have extensive applications, among which optically-transparent adhesives are widely used in displays and touch panels to provide adhesion effects. Typical applications of such adhesives include, for example, adhering a touch panel onto a display and adhering an ITO film or ITO glass of a touch panel to an exterior film or glass. To prevent affecting the visual effects, such adhesives should exhibit proper optical properties such as proper light transmittance and refractive index.

When light travels through different mediums, reflection occurs due to the difference in refractive indexes, thereby affecting light's extraction efficiency. Optical devices, such as thin film and glass, usually have a relatively high refractive index. For example, the refractive index of glass is about 1.52. Nevertheless, a common optically-transparent adhesive, such as acrylate adhesive, has a refractive index of about 1.4 to 1.45, which cannot meet the demand of the industry. Therefore, in order to reduce optical devices' reflection of light and to increase light transmittance, an optically-transparent adhesive with a high refractive index is needed in the industry.

Up to now, the optically-transparent adhesives used in the industry include optical adhesive tape, liquid optically clear adhesive and other similar products. When using optical adhesive tape, it needed to be kept smooth during the adhering process; otherwise, bubbles or wrinkles could generate. In addition, optical adhesive tapes have their disadvantages, such as the complexity of the adhering steps, the lack of reworkability and the necessity for a sufficient thickness. In order to improve the yield of the process, to simplify the steps involved in the process and to meet the requirements for producing a thinner and lighter product, liquid optically clear adhesives have been attracting more attention.

In general, liquid optically clear adhesives often encounter certain disadvantages, such as poor light transmittance and low refractive index, and the flow properties thereof must be properly adjusted so as to avoid the problem of an overflow. In some circumstances, for example, when liquid optically clear adhesives are used in touch panels, they must have the appropriate softness so as to provide excellent cushioning properties and to avoid undesirable visual effects such as water ripple appearing in the touch panels due to stress.

Therefore, the present invention provides a photocurable adhesive composition with a high refractive index. The photocurable adhesive composition of the present invention has appropriate flowability and softness, is easy to be coated and adhered, and can improve the visually aesthetic appearance of screens, thereby effectively resolving the problems encountered in the prior art.

SUMMARY OF THE INVENTION

The present invention provides a photocurable adhesive composition comprising:
 a) a (meth)acrylate oligomer having one or more functional groups,
 b) a mono-functional monomer, a multi-functional monomer, or a mixture thereof,
 c) a photoinitiator, and
 d) a plasticizer having a refractive index of no less than 1.48.

BRIEF DESCRIPTION OF THE DRAWING

FIG. 1 is a schematic view of the exterior portion of a normal touch panel.

DETAILED DESCRIPTION OF THE PRESENT INVENTION

The (meth)acrylate oligomers suitable for the present invention have one or more functional groups, and preferably, have multiple functional groups. The species of the (meth)acrylate oligomers include, for example, but are not limited to: urethane (meth)acrylate, such as aliphatic urethane (meth)acrylate, aromatic urethane (meth)acrylate, aliphatic urethane di(meth)acrylate, aromatic urethane di(meth)acrylate, siliconized urethane (meth)acrylate, aliphatic urethane hexa (meth)acrylate, or aromatic urethane hexa(meth)acrylate; epoxy(meth)acrylate, such as bisphenol-A epoxy di(meth)acrylate or novolac epoxy(meth)acrylate; polyester (meth)acrylate, such as polyester di(meth)acrylate; and (meth)acrylate; and a mixture thereof. According to the present invention, a urethane (meth)acrylate is preferred.

The commercially available (meth)acrylate oligomers suitable for the present invention include: the products named as 6101-100, 611A-85, 6112-100, 6113, 6114, 6123, 6131, 6144-100, 6145-100, 6150-100, 6160B-70, 621A-80, 621-100, EX-06, 6315, 6320, 6323-100, 6325-100, 6327-100, 6336-100 and 6361-100, produced by Eternal Chemical Co. Ltd.; the products named as CN9001, CN9002, CN9004, CN9006, CN9014, CN9021, CN963J75, CN966J75, CN973J75, CN962, CN964, CN965, CN940, CN945 and CN990, produced by Sartomer company.

According to the present invention, the amount of the (meth)acrylate oligomer based on the total weight of the composition is from about 20% to about 90%, preferably from about 40% to about 85%, and more preferably from about 50% to about 80%.

The composition of the present invention contains a mono-functional monomer, a multi-functional monomer, or a mixture thereof, which can provide cross-linking effect so as to reduce the separation of the plasticizer from the composition. The species of the above monomer include, for example, but are not limited to: (meth)acrylic monomers, (meth)acrylate monomers, or a mixture thereof, of which (meth)acrylate monomers are preferred.

The mono-functional (meth)acrylate monomers suitable for the present invention can be selected from, for example, but are not limited to: the group consisting of methyl methacrylate (MMA), butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, 2-hydroxyethyl methacrylate phosphate, hydroxyethyl acrylate (HEA), and 2-hydroxyethyl methacrylate (HEMA) and a mixture thereof.

The multi-functional (meth)acrylate monomers suitable for the present invention can be selected from, for example, but are not limited to: the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), diethylene glycol dimethacrylate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylolpropane trimethacrylate, propoxylated glycerol trimethacrylate, tris(acryloxyethyl)isocyanurate, and trimethylolpropane triacrylate and a mixture thereof.

The mono- or multi-functional (meth)acrylate monomers suitable for the present invention are preferably 2-phenoxy ethyl acrylate, lauryl methacrylate, isodecyl acrylate, isobornyl methacrylate, trimethylolpropane trimethacrylate, pentaerythritol tetraacrylate, ethoxylated trimethylol propane trimethacrylate, propoxylated glycerol trimethacrylate or trimethylolpropane triacrylate.

The commercially available mono- or multi-functional (meth)acrylate monomers suitable for the present invention include: the products named as EM223, EM328, EM2308, EM231, EM219, EM90, EM70, EM235, EM2381, EM2382, EM2383, EM2384, EM2385, EM2386, EM2387, EM331, EM3380, EM241, EM2411, EM242, EM2421 and EM265, produced by Eternal Chemical Co. Ltd.

According to the present invention, the amount of the mono- or multi-functional (meth)acrylate monomers based on the total weight of the composition is from about 5% to about 80%, preferably from about 5% to about 40%, and more preferably from about 5% to about 30%.

The photoinitiator suitable for the present invention is not particularly limited, and can be any photoinitiator that generates free radicals upon photoirradiation and initiates the polymerization through transferring the free radicals. The amount of the photoinitiator can be adjusted depending on the species and amounts of the monomer(s)/oligomer(s) comprised in the composition. Generally, the amount of the photoinitiator based on the total weight of the composition is from about 0.1% to about 5%, preferably from about 0.5% to about 3%.

The photoinitiator suitable for the present invention is not particularly limited, and can be, for example, but is not limited to benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2,4,6-trimethylbenzoyl diphenyl phosphine oxide or a mixture thereof. Preferably, the photoinitiator is benzophenone, 1-hydroxy cyclohexyl phenyl ketone, or 2,4,6-trimethylbenzoyl diphenyl phosphine oxide.

The plasticizer suitable for the present invention has a refractive index of no less than 1.48, preferably no less than 1.49. A plasticizer is an inert, organic substance, which can be physically blended with a polymer to form a homogeneous phase and used for enhancing the softness and flexibility of the polymer. The species of the plasticizer are known to persons having ordinary skill in the art, and can be, for example, phthalates, aliphatic dicarboxylic acid esters, phosphates, phenyl polycarboxylic esters, alkyl sulfonic esters, polyol esters, or epoxies. Preferably, the plasticizer suitable for the present invention is selected from phthalates, phosphates and a mixture thereof.

According to one implementation aspect of the present invention, the plasticizer is a phthalate of the following formula (1):

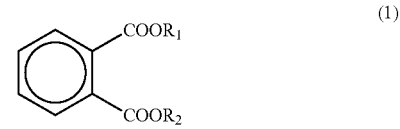

where $R_1$ and $R_2$ can be the same or different, and each independently represent a straight or branched $C_1$-$C_{18}$ alkyl, $C_3$-$C_8$ cycloalkyl, $C_2$-$C_8$ alkenyl or $C_6$-$C_{14}$ aralkyl, and preferably represent methyl, ethyl, propyl, butyl, pentyl, hexyl, heptyl, octyl, nonyl, decyl, undecyl, propenyl, cyclopropyl, cyclobutyl, cyclopentyl, cyclohexyl or benzyl.

The phthalate suitable for the present invention is preferably dimethyl phthalate ($C_6H_4(COOCH_3)_2$), diethyl phthalate ($C_6H_4(COOC_2H_5)_2$), diallyl phthalate ($C_6H_4(COOCH_2CH\!=\!CH_2)_2$), dipropyl phthalate ($C_6H_4(COOCH_2CH_2CH_3)_2$), dibutyl phthalate ($C_6H_4(COO(CH_2)_3CH_3)_2$), di-isobutyl phthalate ($C_6H_4[COOCH_2CH(CH_3)_2]_2$), dipentyl phthalate ($C_6H_4[COO(CH_2)_4CH_3]_2$), dicyclohexyl phthalate ($C_6H_4(COOC_6H_{11})_2$), benzyl butyl phthalate ($CH_3(CH_2)_3OOCC_6H_4COOCH_2C_6H_5$), dihexyl phthalate ($C_6H_4(COO(CH_2)_5CH_3)_2$), di-isoheptyl phthalate ($C_6H_4(COO(CH_2)_4CH(CH_3)_2)_2$), di-(2-ethylhexyl) phthalate ($C_6H_4(COOCH_2CH(C_2H_5)(CH_2)_3CH_3)_2$), di-n-octyl phthalate ($C_6H_4(COO(CH_2)_7CH_3)_2$), di-isooctyl phthalate ($C_6H_4(COO(CH_2)_5CH(CH_3)_2)_2$), di-isononyl phthalate ($C_6H_4(COO(CH_2)_6CH(CH_3)_2)_2$), di-isodecyl phthalate ($C_6H_4(COO(CH_2)_7CH(CH_3)_2)_2$), diundecyl phthalate ($C_6H_4(COO(CH_2)_{10}CH_3)_2$) or a mixture thereof, and more preferably dimethyl phthalate ($C_6H_4(COOCH_3)_2$), diethyl phthalate ($C_6H_4(COOC_2H_5)_2$), diallyl phthalate ($C_6H_4(COOCH_2CH\!=\!CH_2)_2$), benzyl butyl phthalate ($CH_3(CH_2)_3OOCC_6H_4COOCH_2C_6H_5$), di-isononyl phthalate ($C_6H_4(COO(CH_2)_6CH(CH_3)_2)_2$) or a mixture thereof.

According to another implementation aspect of the present invention, the plasticizer is a phosphate of the following formula (2) or (3):

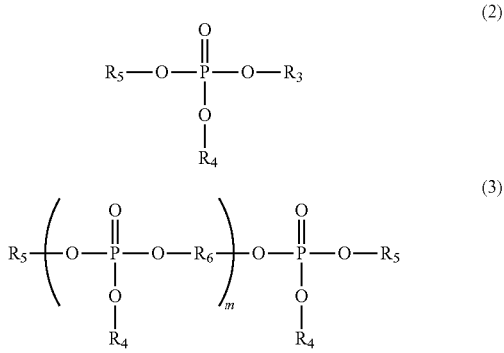

where $R_3$, $R_4$ and $R_5$ can be the same or different, and each independently represent a straight or branched $C_1$-$C_{12}$ alkyl or phenyl, wherein said phenyl can be optionally substituted with one to three straight or branched $C_1$-$C_4$ alkyl; $R_6$ represents a straight or branched $C_1$-$C_{12}$ alkylene or phenylene, wherein said phenylene can be optionally substituted with one to three straight or branched $C_1$-$C_4$ alkyl; and m is an integer from 1 to 30, preferably from 1 to 15.

According to one preferred implementation aspect of the present invention, the plasticizer is a phosphate of the following formula (4):

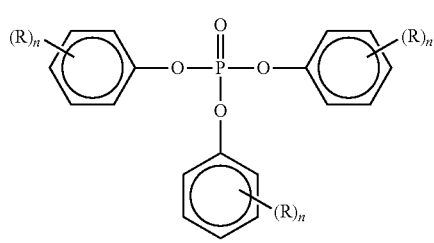

where the occurrences of n can be the same or different, and each independently represent 0, 1, 2 or 3; and the occurrences of R can be the same or different, and each independently represent a straight or branched $C_1$-$C_4$ alkyl, and preferably, methyl.

According to another preferred implementation aspect of the present invention, the plasticizer is a phosphate of the following formula (5):

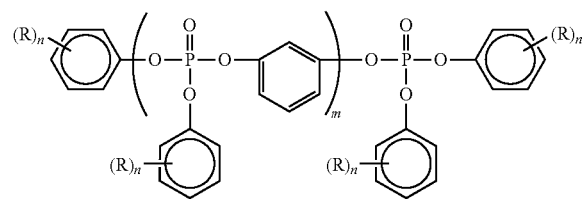

where the occurrences of n can be the same or different, and each independently represent 0, 1, 2 or 3, m is an integer from 1 to 15; and the occurrences of R can be the same or different, and each independently represent a straight or branched $C_1$-$C_4$ alkyl, and preferably, methyl.

Phosphate plasticizers can also provide flame resistance effect, so using phosphate plasticizers, without additional flame retardants, can decrease the possibility of combustion of materials and reduce fire accidents.

The phosphate suitable for the present invention is preferably triphenyl phosphate (TPP), tricresyl phosphate (TCP), tri(isopropylphenyl) phosphate, cresyl diphenyl phosphate, tetraphenyl resorcinol diphosphate, poly(triphenyl phosphate), poly(cresyl diphenyl phosphate) or a mixture thereof.

According to the present invention, the amount of the plasticizer based on the total weight of the composition is from about 1% to about 60%, preferably from about 5% to about 50%, and more preferably from about 10% to about 40%.

The adhesive composition of the present invention can optionally comprise any additives that are known to persons having ordinary skill in the art, which can be, for example, but are not limited to, an initiator synergist, a sensitizer, a coupling agent, a dispersing agent, a wetting agent, a thickening agent, a defoaming agent, a chain transfer agent, an anti-yellowing agent, or a thixotropic agent.

The adhesive composition of the present invention can be applied onto a component by any method known to persons having ordinary skill in the art, adhered to another component, and then cured by energy rays irradiation. For example, the adhesive composition of the present invention can be used for adhering an ITO film or ITO glass, which is used as a sensor in touch panels, to a glass substrate or cover lens, or adhering an ITO film or ITO glass to another ITO film or ITO glass, or adhering a touch panel with an LCD panel module. The steps of the application method include, for example, but are not limited to:

(a) mixing a (meth)acrylate oligomer, a mono- or multi-functional monomer, a photoinitiator, a plasticizer and suitable additives to form a composition;

(b) coating the composition obtained in step (a) onto an ITO film or ITO glass to form a coated layer with a thickness of about 100~200 μm, and then adhering it to a substrate, such as a glass substrate, cover lens, ITO film or ITO glass; and (c) curing the coating layer by energy rays irradiation.

According to step (c) above, the adhesive composition of the present invention can be cured by being irradiated with energy rays and photo-polymerized, and provides good adhesion after being cured. The energy rays mentioned above refer to the light sources that have a certain range of wavelengths, such as ultra violet light, infrared light, visible light or high energy rays (electron beam), of which ultra violet light is preferred. The intensity of irradiation can be from 500 mJ/cm² to 5000 mJ/cm², and preferably, from 2000 mJ/cm² to 4000 mJ/cm².

The adhesive composition of the present invention comprises a plasticizer having a refractive index of no less than 1.48. Since the composition has a high cross-linking density after being cured, the plasticizer is not liable to isolate. Hence, the adhesive composition of the present invention would not cause environmental protection issues. The adhesive composition of the present invention, after being cured, exhibits good light transmittance and high refractive index. As compared to the adhesive composition without a plasticizer being added, the adhesive composition of the present invention has a higher bulk refractive index after being cured. The adhesive composition of the present invention has appropriate softness and is useful in optical electronic products, especially in displays or touch panels, as an adhesive or liquid optically clear adhesive (LOCA) for providing cushioning properties and improving the visually aesthetic appearance of screens. Moreover, the adhesive composition of the present invention has appropriate flowability, is easy to be coated and adhered, and has excellent reworkability. Therefore, it can be used in displays or touch panels, in place of optical adhesive tapes, to simplify the manufacture process and improve the yield of the process.

The following examples are used to further illustrate the present invention, but not intended to limit the scope of the present invention. Any modifications or alterations that can be easily accomplished by persons skilled in the art fall within the scope of the disclosure of the specification and the appended claims.

Examples 1-10 and Comparative Example 1

The photocurable adhesive compositions of Examples 1 to 10 and Comparative Example 1 were prepared according to the method described below and the components shown in Table 1.

The photocurable adhesive compositions were prepared by mixing and stirring the components in the amounts by weight (grams) as given in Table 1 in a darkroom at ambient temperature until homogeneous mixtures were produced.

TABLE 1

| example | component | | | | | |
|---|---|---|---|---|---|---|
|  | a | b | c | d | e | f |
| Example 1 | 32 | 5 | 0.25 | 18 | 0 | 0.4 |
| Example 2 | 32 | 5 | 0.25 | 20 | 0 | 0.4 |
| Example 3 | 32 | 5 | 0.25 | 22 | 0 | 0.4 |
| Example 4 | 32 | 5 | 0.25 | 24 | 0 | 0.4 |
| Example 5 | 32 | 5 | 0.25 | 0 | 2 | 0.4 |
| Example 6 | 32 | 5 | 0.25 | 0 | 4 | 0.4 |
| Example 7 | 32 | 5 | 0.25 | 0 | 18 | 0.4 |
| Example 8 | 32 | 5 | 0.25 | 0 | 20 | 0.4 |
| Example 9 | 32 | 5 | 0.25 | 0 | 22 | 0.4 |
| Example 10 | 32 | 5 | 0.25 | 0 | 24 | 0.4 |
| Comparative Example 1 (no plasticizer) | 32 | 5 | 0.25 | 0 | 0 | 0.4 |

(a): urethane acrylate oligomer (EX-06, produced by Eternal Chemical Co. Ltd.)
(b): mono-functional monomer (isodecyl acrylate; EM219, produced by Eternal Chemical Co. Ltd.)
(c): multi-functional monomer (trimethylolpropane triacrylate; EM231, produced by Eternal Chemical Co. Ltd.)
(d): plasticizer (di-isononyl phthalate ($C_6H_4(COO(CH_2)_6CH(CH_3)_2)_2$))
(e): plasticizer (tricresyl phosphate (TCP))
(f): photoinitiator (1-hydroxy cyclohexyl phenyl ketone; Irgacure 184, produced by BASF company)
All of the components (a)-(f) have a purity >99%.

Comparative Example 2

Commercially available optical adhesive: DBA2000, DuPont company.

Test Methods:

Viscosity: The viscosity of the compositions was measured at 25° C. by using a Brookfield LV viscometer.

Refractive index: The refractive index of the compositions was measured by using a DR-A1 A-Line Refractometer (ATAGO Company). Then, the compositions were cured with ultra violet light in an irradiation intensity of 3000 mJ/cm$^2$, and the refractive index of the cured compositions was measured.

Hardness: The hardness of the cured compositions was measured by using a PGR305 TYPE E hardness tester (TECLOCK Company).

Light transmittance: The light transmittance of the cured compositions was measured by using a NDH 5000W Haze Meter (Nippon Denshoku Industries Co., Ltd.).

Test Results:
The test results were recorded in Table 2.

TABLE 2

|  | viscosity (cps) | hardness E | light transmittance (%) | refractive index (before curing/after curing) |
|---|---|---|---|---|
| Example 1 | 3200 | 16 | >99 | 1.468/1.473 |
| Example 2 | 3000 | 14 | >99 | 1.469/1.480 |
| Example 3 | 2850 | 12 | >99 | 1.469/1.485 |
| Example 4 | 2650 | 11 | >99 | 1.470/1.496 |
| Example 5 | 13200 | 32 | >99 | 1.465/1.471 |
| Example 6 | 11300 | 31 | >99 | 1.468/1.480 |
| Example 7 | 4250 | 16 | >99 | 1.489/1.512 |
| Example 8 | 3900 | 13 | >99 | 1.491/1.518 |
| Example 9 | 3600 | 14 | >99 | 1.492/1.520 |
| Example 10 | 3300 | 12 | >99 | 1.494/1.524 |
| Comparative Example 1 | 13500 | 34 | >99 | 1.461/1.467 |
| Comparative Example 2 | 700-900 | 20-40 | >99 | 1.460/1.465 |

It can be seen from Table 1 that, after curing, the adhesive compositions of the present invention have a light transmittance of more than 99%; and as compared to the adhesive composition that does not contain any plasticizer (Comparative Example 1) and the commercially available optical adhesive composition, the adhesive compositions of the present invention have a higher refractive index and can have an enhanced refractive index (after curing) of 1.471 and more.

In addition, due to the use of the plasticizer, the coating layer produced by the adhesive compositions of the present invention can have lower hardness and exhibit desired cushioning properties, and therefore, can prevent touch panels from undesirable visual effects, such as water ripples, resulting from the stress.

What is claimed is:

1. A photocurable adhesive composition comprising:
   a) a (meth)acrylate oligomer having one or more functional groups,
   b) a mono-functional monomer, a multi-functional monomer, or a mixture thereof,
   c) a photoinitiator, and
   d) a plasticizer having a refractive index of no less than 1.48, wherein the plasticizer is selected from the group consisting of phosphates, alkyl sulfonic esters, polyol esters, epoxies and a mixture thereof.

2. The adhesive composition according to claim 1, wherein the (meth)acrylate oligomer is selected from the group consisting of a urethane (meth)acrylate, an epoxy (meth)acrylate, a polyester (meth)acrylate, a (meth)acrylate and a mixture thereof.

3. The adhesive composition according to claim 2, wherein the (meth)acrylate oligomer is a urethane (meth)acrylate.

4. The adhesive composition according to claim 1, wherein the amount of the (meth)acrylate oligomer based on the total weight of the composition is from about 20% to about 90%.

5. The adhesive composition according to claim 4, wherein the amount of the (meth)acrylate oligomer based on the total weight of the composition is from about 40% to about 85%.

6. The adhesive composition according to claim 1, wherein the mono-functional (meth)acrylate monomer is selected from the group consisting of methyl methacrylate, butyl methacrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, 2-hydroxyethyl metharcrylate phosphate, hydroxyethyl acrylate, 2-hydroxyethyl methacrylate and a mixture thereof; and the multi-functional (meth)acrylate is selected from the group consisting of hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, tris(2-hydroxy ethyl) isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, dipentaerythritol hexaacrylate, tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylolpropane trimethacrylate, propoxylated glycerol trimethacrylate, tris(acryloxyethyl) isocyanurate, trimethylolpropane triacrylate and a mixture thereof.

7. The adhesive composition according to claim 1, wherein the amount of component b) based on the total weight of the composition is from about 5% to about 80%.

8. The adhesive composition according to claim 7, wherein the amount of component b) based on the total weight of the composition is from about 5% to about 40%.

9. The adhesive composition according to claim 1, wherein the photoinitiator is selected from the group consisting of benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2,4,6-trimethylbenzoyl diphenyl phosphine oxide and a mixture thereof.

10. The adhesive composition according to claim 9, wherein the photoinitiator is benzophenone, 1-hydroxy cyclohexyl phenyl ketone or 2,4,6-trimethylbenzoyl diphenyl phosphine oxide.

11. The adhesive composition according to claim 1, wherein the amount of the photoinitiator based on the total weight of the composition is from about 0.1% to about 5%.

12. The adhesive composition according to claim 11, wherein the amount of the photoinitiator based on the total weight of the composition is from about 0.5% to about 3%.

13. The adhesive composition according to claim 1, wherein the plasticizer has a refractive index of no less than 1.49.

14. The adhesive composition according to claim 1, wherein the plasticizer is a phosphate of the following formula (2) or (3):

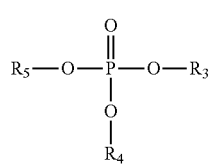

(2)

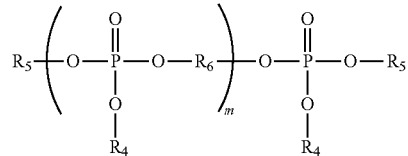

(3)

where $R_3$, $R_4$ and $R_5$ can be the same or different, and each independently represent a straight or branched $C_1$-$C_{12}$ alkyl or phenyl, wherein said phenyl can be optionally substituted with one to three straight or branched $C_1$-$C_4$ alkyl; $R_6$ represents a straight or branched $C_1$-$C_{12}$ alkylene or phenylene, wherein said phenylene can be optionally substituted with one to three straight or branched $C_1$-$C_4$ alkyl; and m is an integer from 1 to 30.

15. The adhesive composition according to claim 14, wherein the plasticizer is a phosphate of the following formula (4):

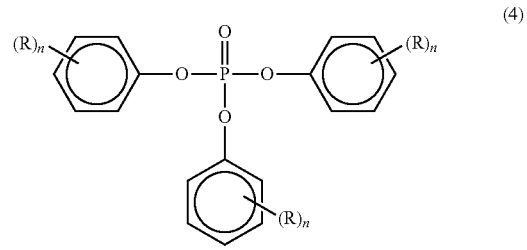

(4)

where the occurrences of n can be the same or different, and each independently represent 0, 1, 2 or 3; and the occurrences of R can be the same or different, and each independently represent a straight or branched $C_1$-$C_4$ alkyl.

16. The adhesive composition according to claim 14, wherein the plasticizer is a phosphate of the following formula (5):

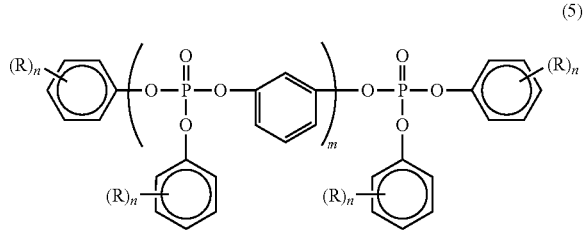

(5)

where the occurrences of n can be the same or different, and each independently represent 0, 1, 2 or 3; m is an integer from 1 to 15; and the occurrences of R can be the same or different, and each independently represent a straight or branched $C_1$-$C_4$ alkyl.

17. The adhesive composition according to claim 14, wherein the plasticizer is selected from the group consisting of triphenyl phosphate, tricresyl phosphate, tri(isopropylphenyl) phosphate, cresyl diphenyl phosphate, tetraphenyl resorcinol diphosphate, poly(triphenyl phosphate), poly(cresyl diphenyl phosphate) and a mixture thereof.

18. The adhesive composition according to claim 1, wherein the amount of the plasticizer based on the total weight of the composition is from about 1% to about 60%.

19. The adhesive composition according to claim 18, wherein the amount of the plasticizer based on the total weight of the composition is from about 5% to about 50%.

20. The adhesive composition according to claim 1 for use in a display or touch panel.

\* \* \* \* \*